United States Patent
Chappaz

(10) Patent No.: US 8,331,499 B2
(45) Date of Patent: Dec. 11, 2012

(54) RECEIVER

(75) Inventor: David Chappaz, Milton (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 709 days.

(21) Appl. No.: 12/428,020

(22) Filed: Apr. 22, 2009

(65) Prior Publication Data

US 2010/0272168 A1  Oct. 28, 2010

(51) Int. Cl.
*H04L 27/01* (2006.01)
(52) U.S. Cl. ......... 375/340; 375/229; 375/267; 375/347
(58) Field of Classification Search .................. 375/229, 375/267, 299, 347, 340
See application file for complete search history.

(56) References Cited

U.S. PATENT DOCUMENTS

| | | | |
|---|---|---|---|
| 2004/0127164 A1* | 7/2004 | Mondragon-Torres et al. | 455/67.11 |
| 2005/0195886 A1* | 9/2005 | Lampinen et al. | 375/144 |
| 2007/0127557 A1* | 6/2007 | Subrahmanya et al. | 375/148 |
| 2007/0165735 A1* | 7/2007 | Pan et al. | 375/267 |
| 2007/0191048 A1* | 8/2007 | Catreux-Erceg et al. | 455/522 |
| 2009/0034585 A1* | 2/2009 | Hua et al. | 375/130 |

* cited by examiner

*Primary Examiner* — Shuwang Liu
*Assistant Examiner* — David Huang
(74) *Attorney, Agent, or Firm* — RatnerPrestia

(57) ABSTRACT

A receiver for a telecommunications system in which a data signal is transmitted using a closed loop transmit diversity system and a pilot signal is transmitted using a space time transmit diversity system, the receiver comprising an equalizer for equalising a signal received by the receiver, wherein the equalizer is configured to produce an equalized signal in which effects caused by a propagation channel through which the data signal was transmitted are alleviated, the receiver further comprising a processor for processing the equalized received signal to recover the pilot signal.

8 Claims, 3 Drawing Sheets

RECEIVER

BACKGROUND OF THE INVENTION

1. Field of the Invention

The present invention relates to receiver for a telecommunications system, and to a method of recovering a pilot signal from a received signal.

2. Description of Related Art

In the High Speed Downlink Packet Access (HSDPA) protocol used in third generation (3G) cellular communications systems a common pilot channel (CPICH) and a data channel, known as the High Speed Downlink Shared Channel (HS-DSCH) are transmitted by the network to a receiver such as a mobile telephone. The CPICH contains a known sequence of symbols which can be used for a number of purposes including channel impulse response estimation and link quality measurement, whilst the HS-DSCH contains data such as encoded voice signals.

To improve the reliability of signals transmitted by the network, diversity schemes are used. The CPICH is commonly transmitted using an open loop space-time-block-coding-based transmit-antenna diversity (STTD) scheme, in which the same information is transmitted using two antennae, with the signal transmitted by one antenna being an altered version of the signal transmitted by the other. The HS-DSCH is also transmitted using a diversity scheme which may be STTD, but is often a closed loop transmit diversity scheme in which two antennae are used to transmit the same information, with the signal transmitted by one of the antennae being a phase-shifted version of the signal transmitted by the other antenna.

The HSDPA protocol can give rise to complicated receiver designs. An equalizer is required in the receiver to negate the effects of the propagation channel through which the HS-DSCH is received. If the HS-DSCH is transmitted using a closed loop transmit diversity scheme, the HS-DSCH can be treated as a single signal being transmitted through a single composite propagation channel, and thus only a single equalizer is needed to equalize (i.e. negate the effects of the propagation channel on) the HS-DSCH to permit accurate recovery of the HS-DSCH.

The CPICH is always transmitted using a STTD scheme when a closed loop transmit diversity scheme is used to transmit the HS-DSCH. This effectively involves generating two slightly different CPICH streams (a process known as STTD encoding) and transmitting the two CPICH streams over two separate propagation channels. An equalizer configured to equalize a signal transmitted using closed loop transmit diversity cannot properly equalize an STTD encoded signal. Thus, in order for a receiver accurately to decode the two separate versions of the CPICH, separate equalizers are required to equalize the signals received through the two separate propagation channels. Thus, two equalizers are required to receive and decode the CPICH accurately.

An HSDPA-compatible receiver must therefore include three equalizers, to ensure that it can accurately recover both the CPICH and the HS-DSCH regardless of the transmit diversity scheme used to transmit the HS-DSCH. Such equalizers are undesirably complex and power-inefficient, as they require a large number of components.

BRIEF SUMMARY OF THE INVENTION

According to a first aspect of the invention there is provided a receiver for a telecommunications system in which a data signal is transmitted using a closed loop transmit diversity system and a pilot signal is transmitted using a space time transmit diversity system, the receiver comprising an equalizer for equalising a signal received by the receiver, wherein the equalizer is configured to produce an equalized signal in which effects caused by a propagation channel through which the data signal was transmitted are alleviated, the receiver further comprising a processor for processing the equalized received signal to recover the pilot signal.

In a receiver according to the present invention, only a single equalizer is required. This equalizer is configured to recover the data signal, whilst the processor is able to reconstruct the pilot signal from the equalized signal. The receiver of the present invention requires fewer components than known receivers, thus reducing the cost and silicon area required (where the receiver is implemented in silicon).

The processor may be configured to recover the pilot signal by processing a received improperly equalized version of the pilot signal.

The processor may be configured to recover the pilot signal by modifying the received improperly equalized version of the pilot signal by reference to a known pilot signal.

The processor may be configured to separate contributions of first and second transmit antennae to the improperly equalized version of the received pilot signal.

In one embodiment, the received improperly equalized version of the pilot signal may be a symbol-level signal.

In an alternative embodiment, the processor may be configured to recover the pilot signal by processing a received chip-level signal.

According to a second embodiment of the invention there is provided a method of recovering a pilot signal which has been transmitted using a space time transmit diversity system with a data signal which has been transmitted using a closed loop transmit diversity system, the method comprising receiving a signal containing the pilot signal and the data signal, equalising the received signal using an equalizer which is configured to produce an equalized signal in which effects caused by a propagation channel through which the data signal was transmitted are alleviated and processing the equalized received signal to recover the pilot signal.

The method may further comprise processing a received improperly equalized version of the pilot signal.

The method may further comprise modifying the received improperly equalized version of the pilot signal by reference to a known pilot signal.

The method may further comprise separating contributions of first and second transmit antennae to the improperly equalized version of the received pilot signal.

In one embodiment, the received improperly equalized version of the pilot signal may be a symbol-level signal.

In an alternative embodiment, the method may comprise processing a received chip-level signal.

BRIEF DESCRIPTION OF THE DRAWINGS

Embodiments of the invention will now be described, strictly by way of example only, with reference to the accompanying drawings, of which

DETAILED DESCRIPTION OF THE INVENTION

Figure 1:
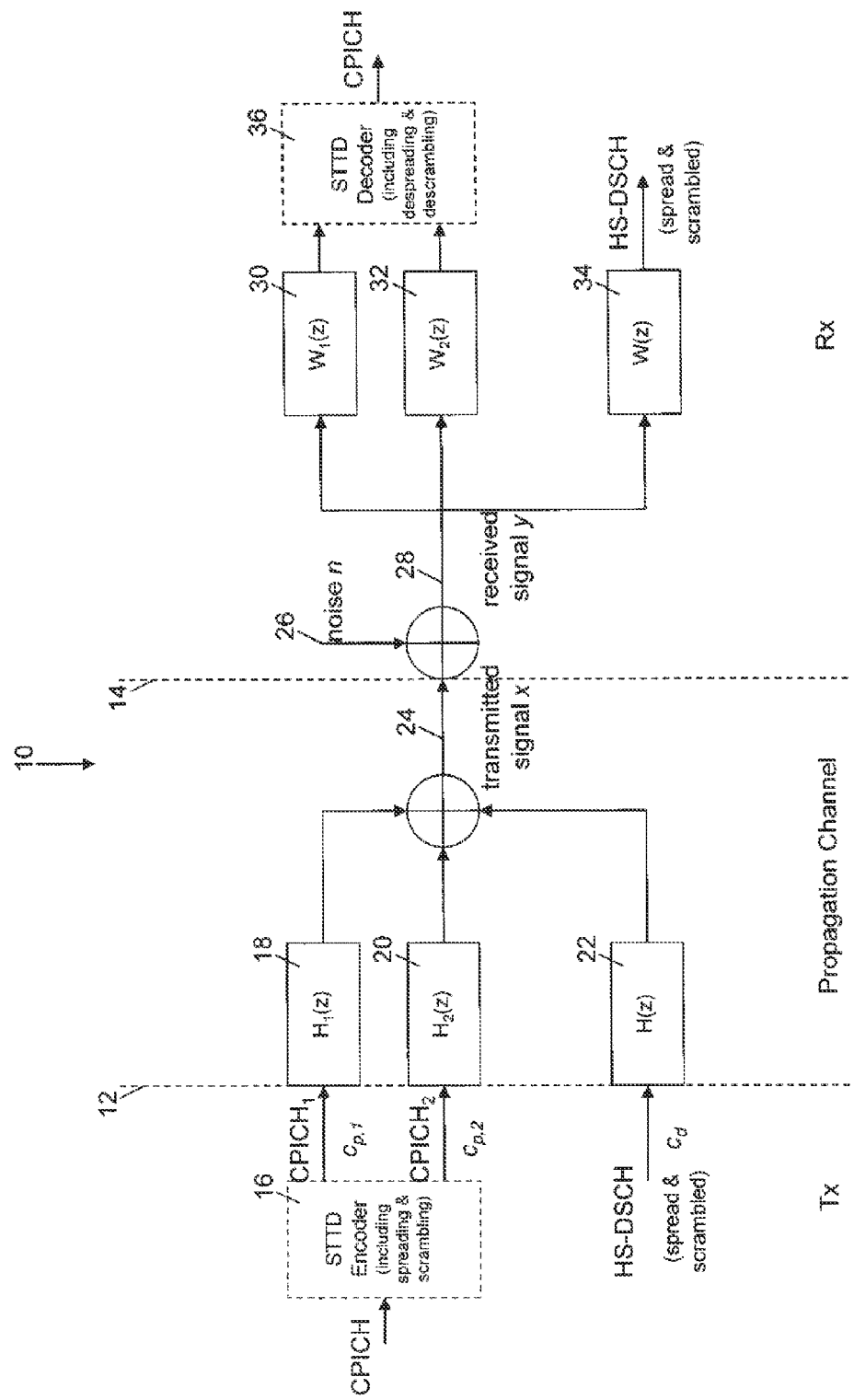
FIG. 1 is a schematic representation of a model of a prior art system for transmitting and receiving signals using the HSDPA protocol.

Referring first to FIG. 1, a model of a prior art system for transmitting and receiving signals using the HSDPA protocol is shown generally at 10. This model can be considered as being comprised of a transmit part, delimited by the dashed line 12, a receive part, delimited by the dashed line 14 and a propagation channel, which lies between the dashed lines 12 and 14.

In this model, the CPICH is transmitted using a STTD transmit diversity scheme whilst the HS-DSCH is transmitted using a closed loop transmit diversity scheme. Thus, in the transmit part of the system, the CPICH is encoded by a STTD encoder 16 to generate separate first and second versions of the CPICH for transmission using two separate antennae. The HS-DSCH is transmitted using a closed loop transmit diversity scheme, with the signal transmitted on the second antenna being a phase-shifted version of the signal transmitted on the first antenna so no additional encoding is required. The signal received at the receive part 14 can be regarded as a single signal containing the HS-DSCH transmitted over a single virtual composite channel H, which is a combination of two physical propagation channels $H_1$ and $H_2$.

As the CPICH is transmitted using a STTD scheme it is effectively transmitted over two separate propagation channels, $H_1(z)$ and $H_2(z)$, which are shown in FIG. 1 at 18 and 20 respectively. The HS-DSCH is transmitted using a closed loop transmit diversity scheme, so can be treated as being transmitted over a single composite propagation channel $H(z)$, shown at 22 in FIG. 1, whose transfer function is equal to $$\frac{H_1(z) + \xi H_2(z)}{\sqrt{2}}.$$

The signal 24 transmitted from the transmit part 12 of the system can thus be modelled as a combination of the first version of the CPICH and the first propagation channel 18, the second version of the CPICH and the second propagation channel 20 and the HS-DSCH and the composite propagation channel 22.

The receive part 14 of the system 10 can be modelled to include a source of additive white gaussian noise, to model the effects of noise on the system 10 as a whole. Thus, the received signal 28 can be modelled as the transmitted signal 24 modified by the noise. In order successfully to recover both the pilot channel (CPICH) and the data channel (HS-DSCH) the receive part 14 of the system 10 must compensate for the effects of the first and second propagation channels 18, 20, so as to recover the CPICH, and for the effects of the composite propagation channel 22, to recover the HS-DSCH. To this end, the receive part includes three parallel equalizers 30, 32, 34. The first equalizer 30 is configured to compensate for the effects of the first propagation channel 18 on the first version of the CPICH. The second equalizer 32 is configured to compensate for the effects of the second propagation channel 20 on the second version of the CPICH, whilst the third equalizer 34 is configured to compensate for the effects of the composite propagation channel 22 on the HS-DSCH. The first and second equalizers 30, 32 thus recover the first and second versions of the CPICH, whilst the third equalizer 34 recovers the HS-DSCH. The first and second equalizers 30, 32 have outputs which are fed to a STTD decoder 36 which is configured to recover the original CPICH from the first and second versions recovered by the first and second equalizers 30, 32.

Aside from despreading and descrambling to recover the transmitted symbols based on the chip-level signal produced by the equalizer, no further processing of the HS-DSCH is required.

Figure 2:
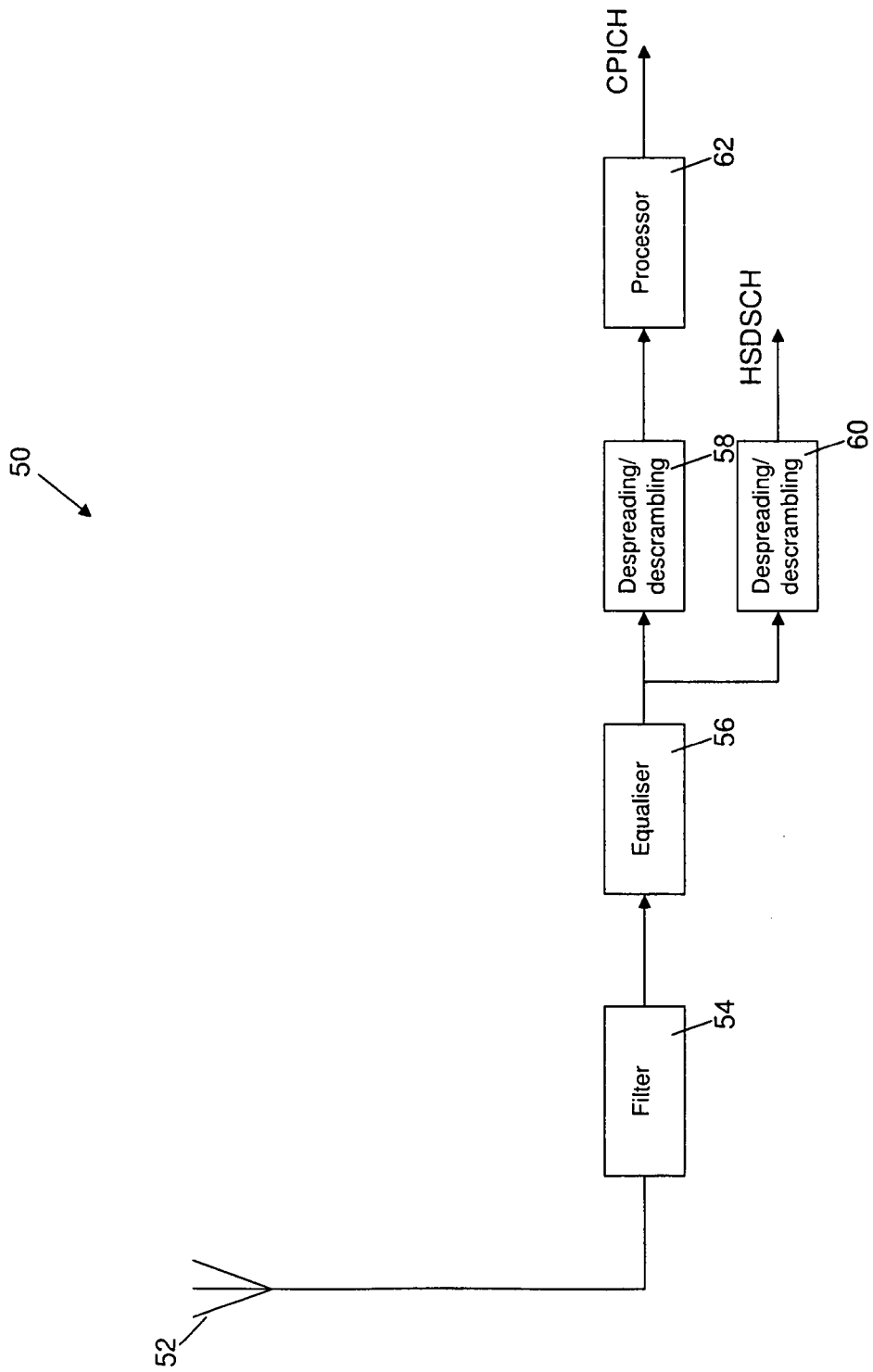
FIG. 2 is a schematic representation showing elements of a receiver according to an embodiment of the present invention.

Turning now to FIG. 2, an architecture for a receiver according to an embodiment of the present invention is shown generally at 50. In this architecture an antenna 52 is provided for receiving signals transmitted through a propagation channel. A filter 54 is provided in the receiver chain to remove unwanted signal components such as out of band interference signals. The received signal is passed to a single equalizer 56, which is configured to equalize received signals which were transmitted using a closed loop transmit diversity scheme (i.e. it is configured to equalize the virtual composite channel $H(z)$). The equalized signal is passed to separate, parallel despreading and descrambling units 58, 60. The first despreading and descrambling unit 58 is configured to negate the effects of spreading and scrambling applied to the CPICH of a transmitted signal, whilst the second despreading and descrambling unit 60 is configured to negate the effects of spreading and scrambling applied to the HS-DSCH of the transmitted signal. Thus, the output of the second despreading and descrambling unit 60 is the HS-DSCH of the transmitted signal, whilst the output of the first despreading and descrambling unit 58 is made up of contributions from the versions of the CPICH transmitted by the two transmit antennae of the transmitter. A processor 62 is provided for processing the despread and descrambled signal output by the first despreading and descrambling unit 58 to recover the original CPICH, as will be described below with reference to FIG. 3.

Figure 3:
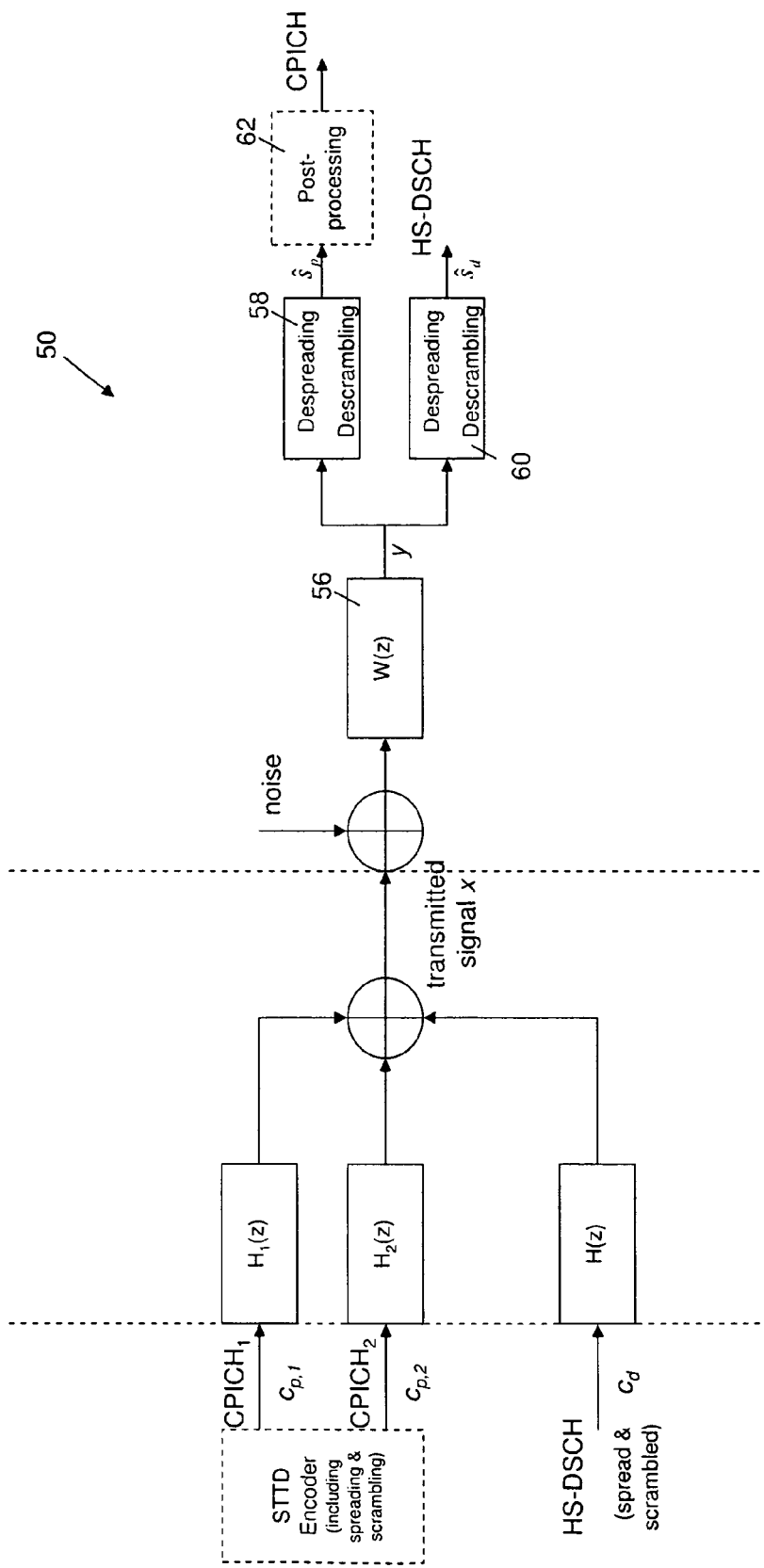
FIG. 3 is a schematic representation of a model of a system for transmitting and receiving signals using the HSDPA protocol which employs the receiver architecture shown in FIG. 2.

FIG. 3 is a schematic representation of a model of a transmit/receive system using a receiver according to an embodiment of the present invention. The transmit part is identical to that of the model shown in FIG. 1, and thus will not be described again in detail.

The receive part of the model of FIG. 3 differs from that of the model of FIG. 1 in that a single equalizer 56 is provided, which is configured to equalize received signals which were transmitted using a closed loop transmit diversity scheme, as is described above. The output of the equalizer 56 is fed into parallel first and second despreading and descrambling units 58, 60, with the second despreading and descrambling unit 60 providing the original transmitted HS-DSCH (plus some noise), as is described above. The output of the first despreading and descrambling unit 58 is passed to a processor 62 which retrieves the original transmitted CPICH from the equalized received signal.

At a chip level (i.e. after scrambling and spreading of the transmitted signal), the transmitted signal comprises three components, $c_{p,1}$, which is the spread and scrambled CPICH transmitted on the first antenna of the transmitter, $c_{p,2}$, which is the spread and scrambled CPICH transmitted on the second antenna of the transmitter, and $c_d$, which is the spread and scrambled HS-DSCH.

The received equalized chip stream, y, prior to despreading and descrambling in the receiver 50, can therefore be represented as $$y = c_{p,1} * (h_1 * w) + c_{p,2} * (h_2 * w) + c_d * (h * w) \tag{1}$$

In the receiver 50, the effect of the first and second despreading and descrambling units 58, 60 on the received signal is to separate the contribution of a specific data channel from contributions of other data channels (i.e. the first despreading and descrambling unit 58 uses the CPICH spreading and scrambling codes to separate the CPICH from the HS-DSCH, whilst the second despreading and descrambling unit 60 uses the HS-DSCH spreading and scrambling codes to separate the HS-DSCH from the CPICH). Additionally, the despreading and descrambling process which occurs in the receiver 50 separates the contribution of the main (synchronised) propagation path from that of advanced or delayed paths.

As is explained above, the equalizer 56 (W(z)) is designed to recover data encoded using a closed loop transmit diversity scheme, i.e. it is designed to equalize the virtual composite channel H(z). In an ideal case, the convolution of h with w would be a perfect dirac (pulse). If L is the length of the channel impulse response h and M is the length of the equalizer impulse response w, the convolution h*w has a length L+M−1.

In practice it is impossible to obtain a perfect pulse for the result of the convolution h*w, but the equalizer 56 is designed to produce an output which is as close as possible to this ideal, such that the result of the convolution h*w exhibits a pulse at a chosen delay D, which lies within the range 0–(L+M−2). This peak represents the main path of the equalized propagation channel but there are additional residual paths, typically of lesser amplitudes, at delays other than D.

At the symbol level (i.e. after despreading and descrambling in the receiver 50), the output signals of the first and second despreading and descrambling units 58, 60 respectively can be expressed as $$\hat{s}_p(k)=s_{p,1}(k)\cdot(w*h_1)(D)+s_{p,2}(k)\cdot(w*h_2)(D)(\text{plus some noise}) \quad (2)$$

where $s_{p,1}(k)$ is the $k^{th}$ CPICH symbol transmitted on the first antenna of the transmitter, and $s_{p,2}(k)$ is the $k^{th}$ symbol transmitted on the second antenna of the transmitter, and $$\hat{s}_d(k)=s_d(k)\cdot(w*h)(D)(\text{plus some noise}), \quad (3)$$

where $s_d(k)$ is the $k^{th}$ HS-DSCH symbol transmitted by the transmitter.

D is a delay selected to optimise the performance of the equalizer 56, as is explained above, and will be familiar to those skilled in the art.

It will be noted from the expressions above that the effect of the despreading and descrambling process carried out in the receiver 50 is that in the symbol level signal $\hat{s}_p(k)$ only contributions from the CPICH remain, and the chips $c_{p,1}$ and $c_{p,2}$ have been transformed into the symbols $s_{p,1}(k)$ and $s_{p,2}(k)$. Additionally, only contributions from the synchronised path remain.

Complex values $g_1$ and $g_2$ can be calculated to represent the effects of the equalizer 56 (W) on the propagation channels $H_1$ and $H_2$:

$$g_1=(h_1*w)(D) \quad (4)$$

$$g_2=(h_2*w)(D) \quad (5)$$

$h_1$ and $h_2$ are the two propagation channel impulse responses for the separate propagation channels over which the CPICH channel is transmitted by the transmit antennae, and these can be obtained by a channel estimation step, which will be well-known to those skilled in the art. The values of $g_1$ and $g_2$ can be obtained by evaluating the convolutions of expressions (4) and (5) above at the time D, and once $g_1$ and $g_2$ are known the received CPICH symbols can be corrected by the processor 62 to recover the transmitted CPICH, as will be described below.

Substituting $g_1$ and $g_2$ into expression (2) above:

$$\hat{s}_p(k)=g_1\cdot s_{p,1}(k)+g_2\cdot s_{p,2}(k) \quad (6)$$

It will be clear from expression (6) that the signal $\hat{s}_p(k)$ contains contributions from both transmit antennae. $\hat{s}_p(k)$ can be thought of as improperly equalized received CPICH symbols. In order to recover the transmitted CPICH (in the form it was in prior to STTD encoding), it is necessary to separate the contributions from the two transmit antennae.

The CPICH signal is a known periodic sequence of symbols. Thus, the STTD-encoded CPICH symbols transmitted by the two antennae at particular symbol periods are known, as shown in the table below:

| Symbol period | 4k | 4k + 1 | 4k + 2 | 4k + 3 |
|---|---|---|---|---|
| Antenna 1: $s_{p,1}$ | $\dfrac{s_p}{\sqrt{2}}$ | $\dfrac{s_p}{\sqrt{2}}$ | $\dfrac{s_p}{\sqrt{2}}$ | $\dfrac{s_p}{\sqrt{2}}$ |
| Antenna 2: $s_{p,2}$ | $\dfrac{s_p}{\sqrt{2}}$ | $-\dfrac{s_p}{\sqrt{2}}$ | $-\dfrac{s_p}{\sqrt{2}}$ | $\dfrac{s_p}{\sqrt{2}}$ | where $s_p$ represents the complex symbol $$s_P = \frac{1+j}{\sqrt{2}}.$$

The table $$\frac{1}{\sqrt{2}}$$

in the table above represents the fact that the energy of the CPICH is equally split across the two transmit antennae.

Pairs of received, improperly equalized, CPICH symbols can therefore be evaluated and corrected by the processor 60 to recover the transmitted CPICH.

Defining a pair of partially equalized received CPICH symbols at even and odd symbol periods received from antenna 1 as $\hat{s}_1$ and a pair of partially equalized received CPICH symbols at even and odd symbol periods received from antenna 2 as $\hat{s}_2$:

$$\hat{s}_1(2k)=\hat{s}_p(4k)+\hat{s}_p(4k+1) \text{ and } \hat{s}_1(2k+1)=\hat{s}_p(4k+2)+\hat{s}_p(4k+3) \quad (7)$$

$$\hat{s}_2(2k)=\hat{s}_p(4k)-\hat{s}_p(4k+1) \text{ and } \hat{s}_2(2k+1)=-\hat{s}_p(4k+2)+\hat{s}_p(4k+3) \quad (8)$$

Inserting equation (6) into expression (7):

$$\hat{s}_1(2k)=g_1\cdot s_{p,1}(4k)+g_2\cdot s_{p,2}(4k)+g_1\cdot s_{p,1}(4k+1)+g_2\cdot s_{p,2}(4k+1) \quad (9)$$

Substituting data from the table above into expression (9):

$$\hat{s}_1(2k)=g_1\cdot\frac{S_p}{\sqrt{2}}+g_2\cdot\frac{S_p}{\sqrt{2}}+g_1\cdot\frac{S_p}{\sqrt{2}}-g_2\cdot\frac{S_p}{\sqrt{2}}=2g_1\cdot\frac{S_p}{\sqrt{2}} \quad (10)$$

Similarly $$\hat{s}_1(2k+1)=2g_1\cdot\frac{S_p}{\sqrt{2}},$$

$$\hat{s}_2(2k)=2g_2\cdot\frac{S_p}{\sqrt{2}} \text{ and}$$

$$\hat{s}_2(2k+1)=2g_2\cdot\frac{S_p}{\sqrt{2}}$$

Thus, the contributions of the two transmit antennae to the improperly equalized received CPICH symbols $\hat{s}_p$ can be isolated, with symbols $\hat{s}_1$ depending only on contributions from the first transmit antenna (as $g_1$ depends on the equalizer 56 ($w$) and the first propagation channel $h_1$) and with symbols $\hat{s}_2$ depending only on contributions from the second transmit antenna (as $g_2$ depends on the equalizer 56 ($w$) and the second propagation channel $h_2$).

The complex values $g_1$ and $g_2$ are not independent, as they are both dependent upon the equalizer 56, which has a transfer function W. The equalizer 56 is designed to equalize the composite propagation channel H, which is a combination of the first and second propagation channels $H_1$ and $H_2$.

The closed loop transmit diversity scheme used to transmit the HS-DSCH uses two antennae to transmit the HS-DSCH symbols, with the second antenna transmitting the same symbols as the first antenna but with a phase shift represented by a complex phasor $\xi$ and with the total energy of the HS-DSCH split equally across the two transmit antennae. Thus, the composite propagation channel H can be expressed as $$H = \frac{H_1 + \xi \cdot H_2}{\sqrt{2}} \text{ or } h = \frac{\xi \cdot h_2}{\sqrt{2}} \tag{11}$$

The equalizer 56 may have a normalised transfer function, such that, for example, $$(h*w)(D)=1,$$

i.e. the equalizer 56 compensates for the effect of the composite channel H on a transmitted signal such that at a delay D there is a peak of unity magnitude. It will be appreciated by those skilled in the art that other normalisations are equally suitable.

Using the normalisation of expression (11) above, $$(h*w)(D) = \frac{(h_1 + \xi \cdot h_2)}{\sqrt{2}} * w(D) = 1 \tag{12}$$

Substituting expressions (4) and (5) above into expression (12):

$$(h*w)(D) = \frac{(g_1 + \xi \cdot g_2)}{\sqrt{2}} \tag{13}$$

$$g_1 + \xi \cdot g_2 = \sqrt{2} \tag{14}$$

In other words, when the contribution $g_1$ from the first transmit antenna is combined with the contribution $\xi g_2$ from the second transmit antenna equalisation is achieved.

Returning now to expression 10 above:

$$\hat{s}_1(2k) = 2g_1 \cdot \frac{S_p}{\sqrt{2}},$$

$$\hat{s}_1(2k+1) = 2g_1 \cdot \frac{S_p}{\sqrt{2}},$$

$$\hat{s}_2(2k) = 2g_2 \cdot \frac{S_p}{\sqrt{2}} \text{ and}$$

$$\hat{s}_2(2k+1) = 2g_2 \cdot \frac{S_p}{\sqrt{2}}$$

Defining the signal calculated by the processor 62 at symbol periods (2k) and (2k+1) as $$\tilde{s}_p(2k) = \frac{\hat{s}_1(2k) + \xi \cdot \hat{s}_2(2k)}{2} \text{ and} \tag{15}$$

$$\tilde{s}_p(2k+1) = \frac{\hat{s}_1(2k+1) + \xi \cdot \hat{s}_2(2k+1)}{2} \tag{16}$$

Inserting the values of $\hat{s}_1$ and $\hat{s}_2$ from expression (10) above:

$$\tilde{s}_p(2k) = g_1 \cdot \frac{S_p}{\sqrt{2}} + \xi \cdot 2g_2 \frac{S_p}{\sqrt{2}} = 2 \cdot \frac{S_p}{\sqrt{2}}(g_1 + \xi \cdot g_2) \text{ and} \tag{17}$$

$$\tilde{s}_p(2k+1) = g_1 \cdot \frac{S_p}{\sqrt{2}} + \xi \cdot 2g_2 \frac{S_p}{\sqrt{2}} = 2 \cdot \frac{S_p}{\sqrt{2}}(g_1 + \xi \cdot g_2) \tag{18}$$

Thus, $\tilde{s}_p(2k) = s_p(\text{plus some noise})$ and $\tilde{s}_p(2k+1) = s_p(\text{plus some noise})$ The processor 62 is configured to perform the step of separating the contributions $\hat{s}_1$ and $\hat{s}_2$ made by the two transmit antennae to the imperfectly equalized received CPICH symbols $\hat{s}_p$ output by the despreading and descrambling unit 58. The processor 62 then calculates the values $\tilde{s}_p$ using the known quantities $g_1$, $g_2$ and $\xi$. Apart from the residual noise calculations these values accurately represent the transmitted CPICH symbols $s_p$, and can be regarded as being recovered pilot symbols. These recovered pilot symbols $\tilde{s}_p$ can subsequently be used in the receiver 50, for example to make link quality measurements.

Because all of the processing steps described above are linear, the order in which they are performed by the processor 62 is not important. Thus, in one embodiment of the receiver 50, the positions of the processor 62 and the despreading and descrambling unit 58 can be swapped. In this embodiment the processor 62 is configured to determine received CPICH chips prior to despreading and descrambling of the received signal in the despreading and descrambling unit 58. However, it will be appreciated that this is computationally expensive, and thus in the embodiment illustrated in FIGS. 2 and 3 the processor 62 is configured to determine the received CPICH symbols $\tilde{s}_p$ after despreading and descrambling of the received signal in the despreading and descrambling unit 58.

The receiver of the present invention offers the advantage of reduced cost, silicon area and complexity, as two of the equalizers required in prior art systems are replaced by a single processor configured to perform the calculations outlined above to recover the transmitted CPICH. Additionally, as the CPICH and HS-DSCH are recovered using the single equalizer 56, any noise contribution to the recovered CPICH (which can easily be measured, since the CPICH is a known sequence of symbols) is representative of the noise contribution to the received equalized HS-DSCH. Thus, link quality measurements for the HS-DSCH downstream in the receiver 50 can be improved in comparison to prior art systems.

Although the receiver 50 of the present invention has been described above in terms of functional blocks, it will be appreciated by those skilled in the relevant art that the receiver 50 could be implemented in a number of ways, for example as one or more circuits comprising discrete components, or as an appropriately configured Field Programmable Gate Array (FPGA) or Digital Signal Processor (DSP) or in a general-purpose computer or processor executing suitable instructions.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

I claim:

1. A receiver for a telecommunications system in which a data signal is transmitted using a closed loop transmit diversity system and a pilot signal is transmitted using a space time transmit diversity system through two different channels H1 and H2, the receiver comprising:
    a single equalizer for equalizing a signal received by the receiver, which signal contains the pilot signal and the data signal,
    wherein the equalizer is configured to produce an equalized signal in which effects caused by a propagation channel, H, through which the data signal was transmitted are alleviated, wherein the propagation channel H is a combination of channels H1 and H2,
    a despreading and descrambling unit for generating, from the equalized signal, an improperly equalized version of the pilot signal which includes combined pilot signals received from at least two transmit antennas of the space time transmit diversity system through channels H1 and H2, and equalized according to the propagation channel H, and
    a processor for processing the equalized signal to recover the pilot signal,
    wherein the processor is configured to recover the pilot signal by modifying the improperly equalized version of the pilot signal by reference to a known pilot signal.

2. A receiver according to claim 1 wherein the improperly equalised version of the pilot signal is a symbol-level signal.

3. A receiver according to claim 1 wherein the processor is configured to recover the pilot signal by processing a received chip-level signal.

4. A receiver for a telecommunications system in which a data signal is transmitted using a closed loop transmit diversity system and a pilot signal is transmitted using a space time transmit diversity system through two different channels H1 and H2, the receiver comprising:
    a single equalizer for equalizing a signal received by the receiver, which signal contains the pilot signal and the data signal, wherein the equalizer is configured to produce an equalized signal in which effects caused by a propagation channel, H, through which the data signal was transmitted are alleviated, wherein the propagation channel H is a combination of channels H1 and H2,
    a despreading and descrambling unit for generating, from the equalized signal, an improperly equalized version of the pilot signal which includes combined pilot signals received from at least two transmit antennas of the space time transmit diversity system through channels H1 and H2, and equalized according to the propagation channel H, and
    a processor for processing the equalized signal to recover the pilot signal,
    wherein the processor is configured to separate contributions of the at least two transmit antennas to the improperly equalized version of the pilot signal.

5. A method of recovering a pilot signal which has been transmitted using a space time diversity system through two different channels H1 and H2 with a data signal which has been transmitted using a closed loop transmit diversity system, the method comprising:
    receiving a signal containing the pilot signal and the data signal,
    equalizing the received signal using an equalizer which is configured to produce an equalized signal in which effects caused by a propagation channel, H, through which the data signal was transmitted are alleviated, wherein the propagation channel H is a combination of channels H1 and H2,
    despreading and descrambling the equalized signal to generate an improperly equalized version of the pilot signal which includes combined pilot signals received from at least two transmit antennas of the space time transmit diversity system through channels H1 and H2, and equalized according to the propagation channel H, and
    modifying the improperly equalized version of the pilot signal by reference to a known pilot signal to recover the pilot signal.

6. A method according to claim 5 wherein the improperly equalised version of the pilot signal is a symbol-level signal.

7. A method according to claim 5 further comprising processing a received chip-level signal.

8. A method of recovering a pilot signal which has been transmitted using a space time diversity system through two different channels H1 and H2 with a data signal which has been transmitted using a closed loop transmit diversity system, the method comprising:
    receiving a signal containing the pilot signal and the data signal,
    equalizing the received signal using an equalizer which is configured to produce an equalized signal in which effects caused by a propagation channel, H, through which the data signal was transmitted are alleviated, wherein the propagation channel H is a combination of channels H1 and H2,
    despreading and descrambling the equalized signal to generate an improperly equalized version of the pilot signal which includes combined pilot signals received from at least two transmit antennas of the space time transmit diversity system through channels H1 and H2, and equalized according to the propagation channel H, and
    separating contributions of the at least two transmit antennas to the improperly equalized version of the pilot signal to recover the pilot signal.

* * * * *

UNITED STATES PATENT AND TRADEMARK OFFICE
CERTIFICATE OF CORRECTION

PATENT NO.       : 8,331,499 B2
APPLICATION NO.  : 12/428020
DATED            : December 11, 2012
INVENTOR(S)      : Chappaz Page 1 of 1

It is certified that error appears in the above-identified patent and that said Letters Patent is hereby corrected as shown below:

In the Specification

In Column 6, Line 25, delete "table" and insert -- factor --, therefor.

In Column 6, Line 35, delete "processor 60" and insert -- processor 62 --, therefor.

In Column 7, Line 22, in Equation (11), delete " $h = \dfrac{\xi \cdot h_2}{\sqrt{2}}$ " and insert -- $h = \dfrac{h_1 + \xi \cdot h_2}{\sqrt{2}}$ --, therefor.

In Column 7, Line 45, in Equation (13), delete " $= \dfrac{(g_1 + \xi \cdot g_2)}{\sqrt{2}}$ " and insert -- $\dfrac{(g_1 + \xi \cdot g_2)}{\sqrt{2}} = 1$, i.e. --, therefor.

Signed and Sealed this
Tenth Day of December, 2013

Margaret A. Focarino
*Commissioner for Patents of the United States Patent and Trademark Office*